United States Patent
Bender

(10) Patent No.: US 11,458,826 B2
(45) Date of Patent: Oct. 4, 2022

(54) ENGINE MOUNTING ASSEMBLY FOR A WORK VEHICLE

(71) Applicant: Deere & Company, Moline, IL (US)

(72) Inventor: Jesse J. Bender, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 550 days.

(21) Appl. No.: 16/664,654

(22) Filed: Oct. 25, 2019

(65) Prior Publication Data

US 2021/0122224 A1 Apr. 29, 2021

(51) Int. Cl.
| | |
|---|---|
| *B60K 5/04* | (2006.01) |
| *B62D 25/08* | (2006.01) |
| *B60K 17/24* | (2006.01) |
| *F01M 11/00* | (2006.01) |
| *B60G 3/00* | (2006.01) |

(Continued)

(52) U.S. Cl.
CPC ............... *B60K 5/04* (2013.01); *A01B 51/02* (2013.01); *B60G 3/00* (2013.01); *B60K 17/24* (2013.01); *B62D 25/085* (2013.01); *F01M 1/02* (2013.01); *F01M 11/0004* (2013.01);
(Continued)

(58) Field of Classification Search
CPC .... B60K 5/04; B60K 17/24; B60K 2005/003; B60K 5/00; B60K 5/02; A01B 51/02; B60G 3/00; B62D 25/085; B62D 21/186; F01M 1/02; F01M 11/0004; F01M 2011/0054;
(Continued)

(56) References Cited

U.S. PATENT DOCUMENTS

| 5,152,364 A | 10/1992 | Woods et al. |
|---|---|---|
| 6,470,991 B1 * | 10/2002 | Bowman ............ F01M 11/0004 |
| | | 280/124.109 |

(Continued)

FOREIGN PATENT DOCUMENTS

| DE | 1967064 U | 8/1967 |
|---|---|---|
| DE | 3316655 A1 | 12/1983 |

(Continued)

OTHER PUBLICATIONS

German Search Report issued in application No. DE102020213408.1 dated Oct. 14, 2021 (04 pages).

*Primary Examiner* — Jacob M Amick
*Assistant Examiner* — Charles J Brauch
(74) *Attorney, Agent, or Firm* — Klintworth & Rozenblat IP LLP

(57) ABSTRACT

An engine mounting assembly includes a front frame element defining, in part, a structural load bearing assembly, a differential case mounted to the frame at a frame mounting area, and an oil pan having upright and bottom walls defining an oil sump. The differential case has an opening configured to receive an axle assembly and has walls defining a pan-receiving recess. The oil pan is configured to conform to the pan-receiving recess to be supported by the differential case and overlap the frame mounting area. The oil pan has a mounting flange extending from the upright walls and mounting bores that receives mounting bolts for coupling the oil pan to the engine and the oil pan to the differential case. The differential case and the oil pan form part of the structural load bearing assembly of the work vehicle to transfer structural loads to and from the front frame element.

20 Claims, 5 Drawing Sheets

(51) Int. Cl.
*A01B 51/02* (2006.01)
*F01M 1/02* (2006.01)

(52) U.S. Cl.
CPC ............... *F01M 2011/007* (2013.01); *F01M 2011/0054* (2013.01); *F01M 2011/0058* (2013.01)

(58) Field of Classification Search
CPC ...... F01M 2011/0058; F01M 2011/007; B60Y 2200/22; B60Y 2200/221
See application file for complete search history.

(56) References Cited

U.S. PATENT DOCUMENTS

| | | |
|---|---|---|
| 8,151,757 B2 | 4/2012 | Huenink |
| 2010/0288223 A1 | 11/2010 | Huenink |

FOREIGN PATENT DOCUMENTS

| | | |
|---|---|---|
| DE | 60122906 T2 | 12/2006 |
| DE | 102010028628 A1 | 11/2010 |

\* cited by examiner

ENGINE MOUNTING ASSEMBLY FOR A WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to an engine mounting assembly for work vehicles.

BACKGROUND OF THE DISCLOSURE

Work vehicles, such as agricultural tractors, require a robust powertrain (e.g., diesel engine), drivetrain (e.g., transmission, axles, differentials, wheels or tracks, etc.), and frame in a relatively compact form factor (e.g., height and width). The tractor frame may experience a variety of structural loads. For example, the wheel axle region may support significant static weight loads from on-board components (e.g., engine, transmission, axle, work implements, etc.) and encounter significant operating loads (e.g., via the wheels and suspension and attached work implements). The load-carrying demands on the vehicle and the arrangement and form factor of the vehicle's structural and operating components may impact manufacturing, assembly, and overall dimensions of the engine compartment and of the vehicle platform itself.

SUMMARY OF THE DISCLOSURE

The disclosure provides an engine mounting assembly for a work vehicle and a work vehicle including the same.

In one aspect, the disclosure provides an engine mounting assembly for supporting an engine in a work vehicle. The engine mounting assembly includes a front frame element, a differential case mounted to the front frame element at a frame mounting area, and an oil pan having upright and bottom walls defining an oil sump. The front frame element defines, at least in part, a structural load bearing assembly of the work vehicle. The differential case has an opening configured to receive an axle assembly of the work vehicle and having walls defining, at least in part, a pan-receiving recess. The oil pan is configured, at least in part, to conform to the pan-receiving recess of the differential case to be supported by the differential case and overlap the front frame mounting area. The oil pan has a mounting flange extending from the upright walls with a plurality of mounting bores that receives a plurality of mounting bolts for coupling the oil pan to the engine and the oil pan to the differential case. The differential case and the oil pan form part of the structural load bearing assembly of the work vehicle to transfer structural loads to and from the front frame element.

In another aspect, the disclosure provides a work vehicle including an engine having an engine block, an engine mounting assembly, and a structural load bearing assembly of the work vehicle. The engine defines an engine center of gravity in a longitudinal travel direction of the work vehicle. The engine mounting assembly includes a differential case and an oil pan having upright and bottom walls defining an oil sump. The differential case has a first opening configured to receive an axle assembly of the work vehicle and has walls defining, at least in part, a pan-receiving recess. The oil pan is configured, at least in part, to conform to the pan-receiving recess of the differential case to be supported by the differential case. The oil pan has a mounting flange extending from the upright walls with a plurality of mounting bores that receives a plurality of mounting bolts for coupling the oil pan to the engine and the oil pan to the differential case. The work vehicle includes a front frame element connected to the frame mounting area of the differential case and a rear frame element connected to a rear end of the differential case. At least the engine block, the engine mounting assembly, the front frame element, and the rear frame element form a structural load bearing assembly of the work vehicle that is configured to transfer structural loads between the engine block, the engine mounting assembly, the front frame element, and the rear frame element.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
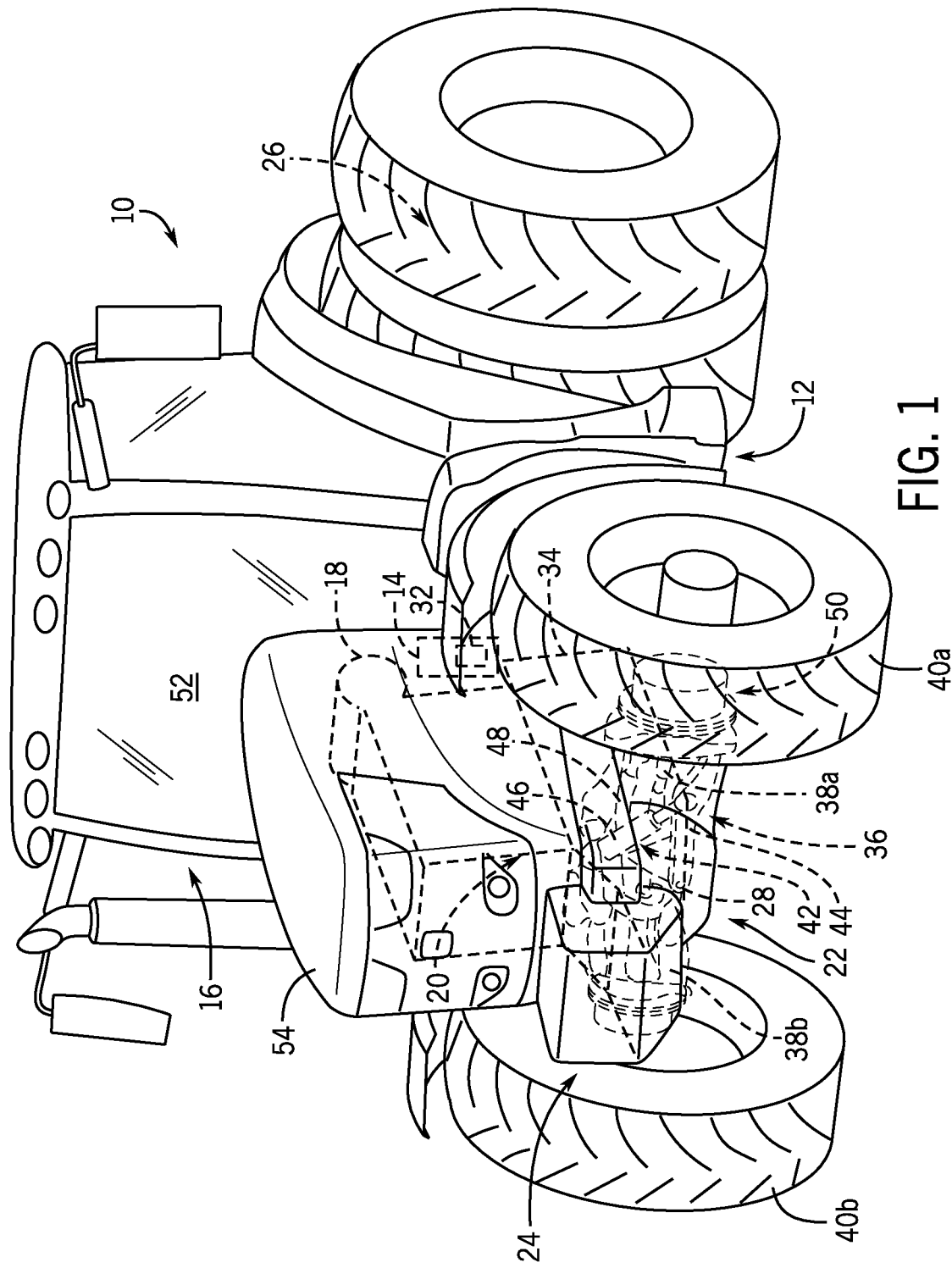
FIG. 1 is a perspective view of an example work vehicle in the form of an agricultural tractor in which an engine mounting assembly may be used in accordance with this disclosure.

The following describes one or more example embodiments of the disclosed engine mounting assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," "circumferential," "lateral," and "transverse" may be used. Such terms are defined, at least in part, with respect to a wheel axle, engine components, and/or suspension components. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached. As used herein, the terms "front," "forward," "rear," and "rearward" are merely example relative terms with respect to a primary direction of travel of a depicted configuration of a work vehicle. In other examples, the components referenced by those terms may be reversed in accordance with the present disclosure.

OVERVIEW

Work vehicles, such as agricultural tractors, typically include components such as a chassis, drivetrain, and engine, that implement various types of tasks over a variety of terrain and conditions. Typically, the work vehicle may be subject to combinations of static and operating loads resulting from the work tasks and the vehicle itself. For example, the static loads come from a variety of components, including the weight of the engine and other vehicle components, the weight of work implements, tongue weight of towed work implements, and/or the weight of any payload carried by work implements. The operating loads (e.g., dynamic or shock loads) include forces transferred through the wheels from the ground (e.g., ruts or imperfections in a field, on-road potholes, etc.), forces transferred through work implements (e.g., soil resistance to tilling or digging), or forces from internal components of the work vehicle (e.g., acceleration and deceleration, engine hop, actuation of work implements, actuation of suspension components, etc.). Various components of the work vehicle may cooperate to form a structural load bearing assembly to accommodate these static and operational loads on the work vehicle. As described below, this disclosure provides an engine mounting assembly that is capable of supporting the various combinations of static and operating loads placed upon a structural load bearing assembly of a work vehicle, particularly at the differential case and oil pan.

Generally, it may be beneficial for work vehicles, especially agricultural tractors, to configure the structural load bearing assembly along the load path to be sufficiently robust to accept the static and dynamic load discussed above, while also configured narrowly to accommodate a variety of work tasks. Whereas trucks or consumer automobiles may have ladder frames or unibody constructions that transfer structural loads throughout the vehicle's width and length, agricultural tractors may have "I" frames defining structural load paths arranged generally centrally along the fore-aft centerlines of the vehicles. In other words, agricultural tractors may not have laterally outboard frame elements that extend longitudinally between front and rear wheel axles to accommodate structural loads. Instead of providing additional, separate frame components that coextend along the operational components of a drivetrain, powertrain, or the like, some operational components may be designed to also accept structural loads according to this disclosure.

As used herein the term "structural load bearing assembly" refers to a network of components forming the frame or chassis of the work vehicle by which loads of the work vehicle itself or loads applied to the work vehicle are supported off of the ground through attached ground-engaging wheels or tracks. In effect, the structural load bearing assembly corresponds to the group of components along a structural load path of the work vehicle. The structural load bearing assembly thus pertains to components having adequate structure to contribute to the load-bearing capacity of the work vehicle frame or chassis, including components that typically have not been considered part of a vehicle frame or chassis. However, the term should not be interpreted to encompass any work vehicle component that, merely by virtue of being a physical part, has some ability to bear loads generally inconsequential to the weight of the work vehicle or the loads applied thereto. For example, an engine mounting assembly for an engine block that includes an oil pan and a differential case, as disclosed herein, may be considered part of a work vehicle structural load bearing assembly, whereas, for example, body panels are not part of the structural load bearing assembly.

In particular, various components of the tractor, including components of the drivetrain such as a differential case and engine block, may be configured to contribute to the structural load path as part of the structural load bearing assembly in addition to serving respective primary functions. For example, a differential case for an agricultural tractor may not only house the mechanical components of a differential (e.g., gear components and axle components), but may also support and transfer internal and external loads throughout the structural load path. Additional components, such as the oil pan between the engine block and the differential case, may also be incorporated into the structural load bearing assembly.

Along with load accommodation, the size and arrangement of the components along the load path, including a differential case and oil pan, may suggest practical considerations with respect to manufacturing and assembly. For suitable strength, the differential case may be formed as a large unitary cast metal piece. Such a cast differential case may be one of the larger cast metal components for a work vehicle and may approach the size limits of casting or subsequently the size limits of an assembly line. Accordingly, incorporation of the oil pan in between the engine block and differential case may be implemented with consideration of not only function but also with respect to the size (e.g., height) of the resulting assembly. In certain embodiments, the oil pan is sized and shaped to closely fit within the differential case and extend forward beyond the differential case. The oil pan is dimensioned such that sufficient volume is provided while also being structurally integrated with the differential case and allowing the differential case to mount a variety of advanced components. The size and arrangement of these internal components affect a variety of overall form factors for the work vehicle, including hood height, hood slope, hood width, and ground clearance, as well as the size and position of a work implement. Generally, the height and slope of a hood over the engine compartment directly affect sightlines of the operator during the direction of the work vehicle and any attached work implements. Accordingly, the present disclosure provides a compact construction that improves these sightlines.

The disclosure also provides an engine mounting assembly that is advantageous for applications with various advanced components incorporated into the wheels, wheel axles, and/or power train. In particular, the engine mounting assembly described herein facilitates implementation of these components by providing improved support capability along the structural load path for the respective functions. Such advanced components may include robust suspension systems that not only dampen loads but also incorporate powered components (e.g., hydraulic or electromechanically powered linkages) to move a wheel axle in response to a variety of detected loads or terrain conditions, thereby resulting in improved ground contact and more efficient work. In another example, the advanced components may include a mechanical front wheel drive (MFWD) system incorporated into a front axle and axle hub. Such a MFWD system provides the capability to selectively drive the front wheels in addition to rear wheels, which allows for engine braking, increased power, and improved traction. For an agricultural tractor or other work vehicle, these advanced components allow for operation under more extreme conditions. Moreover, the benefits of these advanced components result in additional weight and dynamic loads to be supported by the structural load bearing assembly. Accordingly, a stronger structural load bearing assembly in the area of wheel axle mounting is provided according to the present disclosure to implement these improvements.

The disclosure also provides an engine mounting assembly that is advantageous for initial assembly along with repair and maintenance. A forward position of the oil pan and engine allows for maintenance and repairs to be performed without obstruction from the front wheels, wheel axles, differential case, or other components. This accessibility saves costs and reduces time that a work vehicle is out of commission, thereby resulting in more efficient work. For assembly, the disclosed engine mounting assembly may be manufactured with top-down bolting of the oil pan onto the differential case, which is easier and quicker than a bottom-up bolting of conventional assemblies. Moreover, the disclosed oil pan is both structurally sound and compactly designed so as to be mounted to an engine while still on the assembly line, which also streamlines the manufacturing process.

In an agricultural setting, tractor improvements such as those noted above directly correlate to improved structural strength and improvements in manufacturing and assembly as well as work efficiency, lowered costs, and increased crop yield. This disclosure provides an engine mounting assembly for use in work vehicles that addresses these and other aspects relative to conventional arrangements. The engine mounting assembly is capable of achieving the requisite load support and distribution characteristics while incorporating a desired oil pan, engine, drivetrain, and suspension system within a suitable form factor. The systems and components of the example agricultural tractor provide the noted benefits along with requisite work performance and user comfort in the field and during on-road transit.

The following describes one or more example implementations of the disclosed engine mounting assembly. While discussion herein may sometimes focus on the example application of an engine mounting assembly with an embedded oil pan in a large rigid frame agricultural tractor, the disclosed engine mounting assembly may also be applicable to other types of work vehicle, including lower-capacity self-propelled or towed work vehicles, as well as various other agricultural machines (e.g., articulated tractors, utility tractors, front end loaders, harvesters and the like), landscaping machines (e.g., lawn mowers, golf mowers and the like), and various construction and forestry machines (e.g., backhoes, excavators, forestry skidders and so on).

EXAMPLE EMBODIMENTS OF THE WORK VEHICLE AND ENGINE MOUNTING ASSEMBLY

Referring to FIG. 1, in some embodiments, the disclosed work vehicle 10 may be a rigid frame agricultural tractor, although, as noted, the engine mounting assembly described herein may be applicable to a variety of machines, such as articulated-frame tractors, construction vehicles, and forestry vehicles. As shown, the work vehicle 10 may be considered to include a chassis 12, a drivetrain 14, an operator cabin 16, and an engine 18. In one example, the work vehicle 10 may further be considered to include an engine mounting assembly 20 that operates to couple together aspects of the chassis 12, drivetrain 14, and engine 18 into a functional unit that forms part of a structural load bearing assembly 22.

Generally, the chassis 12 is part of the load-bearing framework of the work vehicle 10 and structurally supports the drivetrain 14, operator cabin 16, engine 18, and various other components and systems of the work vehicle 10. The chassis 12 may further support (directly or indirectly) a front coupling area 24 to support the mounting of work implements (not shown) and a rear coupling area 26 for coupling (e.g., towing) work implements. As described in greater detail below, the front coupling area 24 may be formed on or proximate to a front frame element 28, which in turn may be considered part of the engine mounting assembly 20.

The engine 18 provides a source of power to propel the work vehicle 10 through the drivetrain 14, either directly as mechanical power or upon being converted to electric or hydraulic power. In one example, the engine 18 is an internal combustion engine, such as a diesel engine, that is controlled by an engine control module (not shown) of a control system (not shown). As described in greater detail below, the engine 18, particularly an internal combustion engine, is at least partially formed by an engine block 30, which contains the cylinders, pistons, crankshaft, valves and other working components of the engine, and is an integrated component onto which other aspects of the engine 18 may be mounted. In addition to providing tractive power to propel the work vehicle 10, the engine 18 may provide power to various onboard subsystems, including various electrical and hydraulic components of the work vehicle 10. It should be noted that the use of an internal combustion engine is merely an example, as the source of propulsion may be a fuel cell, an electric motor, a hybrid-gas electric motor, or other power-producing devices. As such, although the engine mounting assembly 20 is generally discussed with respect to an engine, other embodiments may incorporate one or more motors or fuel cells as a substitute for the engine 18, and the example characteristics of the mounting assembly discussed herein are appropriately applicable to alternate propulsion systems.

In the illustrated example, the drivetrain 14 includes a transmission 32; a differential (not shown); a differential case 34 that houses, at least in part, the differential driven by the transmission 32; an axle assembly 36 (including respective left and right wheel axles 38a, 38b) coupled to the differential; and one or more left and right steerable wheels 40a, 40b mounted to the axle assembly 36. As noted above, the engine 18 provides power to the transmission 32 that drives the differential and axle assembly 36, which in turn, drives the wheels 40a, 40b mounted thereon to propel the work vehicle 10. The transmission 32 generally includes one or more gear arrangements and/or clutches to modify the speed of the input from the engine into one or more speeds suitable for the axle assembly 36. The differential case 34 is structurally coupled to the engine 18 as part of the engine mounting assembly 20, as discussed in greater detail below.

In this example, the axle assembly 36 includes the pair of front left and right wheel axles 38a, 38b, as well as other suitable mounting components. Each wheel 40a, 40b is mounted on the respective wheel axle 38a, 38b. A suspension system 42 with a suspension linkage 44, a hydraulic assist 46, and steering components 48 may be provided for one or both of the wheels 40a, 40b and/or wheel axles 38a, 38b to facilitate the suspension and steering of the work vehicle 10. As discussed below, aspects of the suspension system 42 may be housed and/or supported by the differential case 34.

The suspension system 42 facilitates, or otherwise interacts with, the drivetrain 14, chassis 12, and/or other aspects of the work vehicle 10. Generally, the suspension system 42 includes various devices that couple each individual wheel axle 38a, 38b to the chassis 12 with mechanical support (e.g., upper and lower control arms, ball joints, steering knuckles, springs, etc.), hydraulic support (including e.g., suspension pistons and cylinders, a control valve manifold, a front differential lock, and hydraulic accumulators), and/or electrical support (including e.g., position sensors, solenoids for hydraulic control valves, and a controller). The suspension system 42 may be configured to not only dampen loads, but also actively maintain the center of the work vehicle 10 (e.g. the operator cabin 16 and the differential case 34) horizontally leveled in response to operating loads and shocks acting upon the wheels 40a, 40b. At the same time the suspension system 42 maintains the wheels 40a, 40b in contact with the ground, directly improving traction and power to the ground. Additionally, the wheel axles 38a, 38b and suspension system 42 may incorporate a mechanical front wheel drive (MFWD) system 50 in a wheel hub. The MFWD system 50 may be selectively engaged (automatically or by operator selection) as dictated by conditions, such as difficult or steep terrain, to improve traction and braking.

As introduced above, the operator cabin 16 is supported on the chassis 12 and functions to house an operator (e.g., a human driver). As such, the operator cabin 16 may also house various types of operator interface and control mechanisms (e.g., various controls wheels, levers, switches, buttons, screens, keyboards, etc.). Generally, the operator cabin 16 includes a window or windshield 52 that enables an operator to view the surrounding environment. In the forward direction, the work vehicle 10 may be considered to have an operator sightline out of the windshield 52, over a panel or hood 54 that covers the engine 18. As noted above and discussed in greater detail below, the engine mounting assembly 20 housed under the hood 54 may be considered to enable advantageous sightlines from the operator cabin 16 for the operator.

As also introduced above, the engine mounting assembly 20 generally supports the engine 18 and functions to mount the engine relative to the chassis 12 and drivetrain 14. The engine mounting assembly 20 is discussed in greater detail with respect to FIGS. 2-4 in which the engine 18 and/or engine mounting assembly 20 are depicted in a side view (FIG. 2), an exploded view (FIG. 3), and an enlarged cross-sectional view (FIG. 4).

Figure 2:
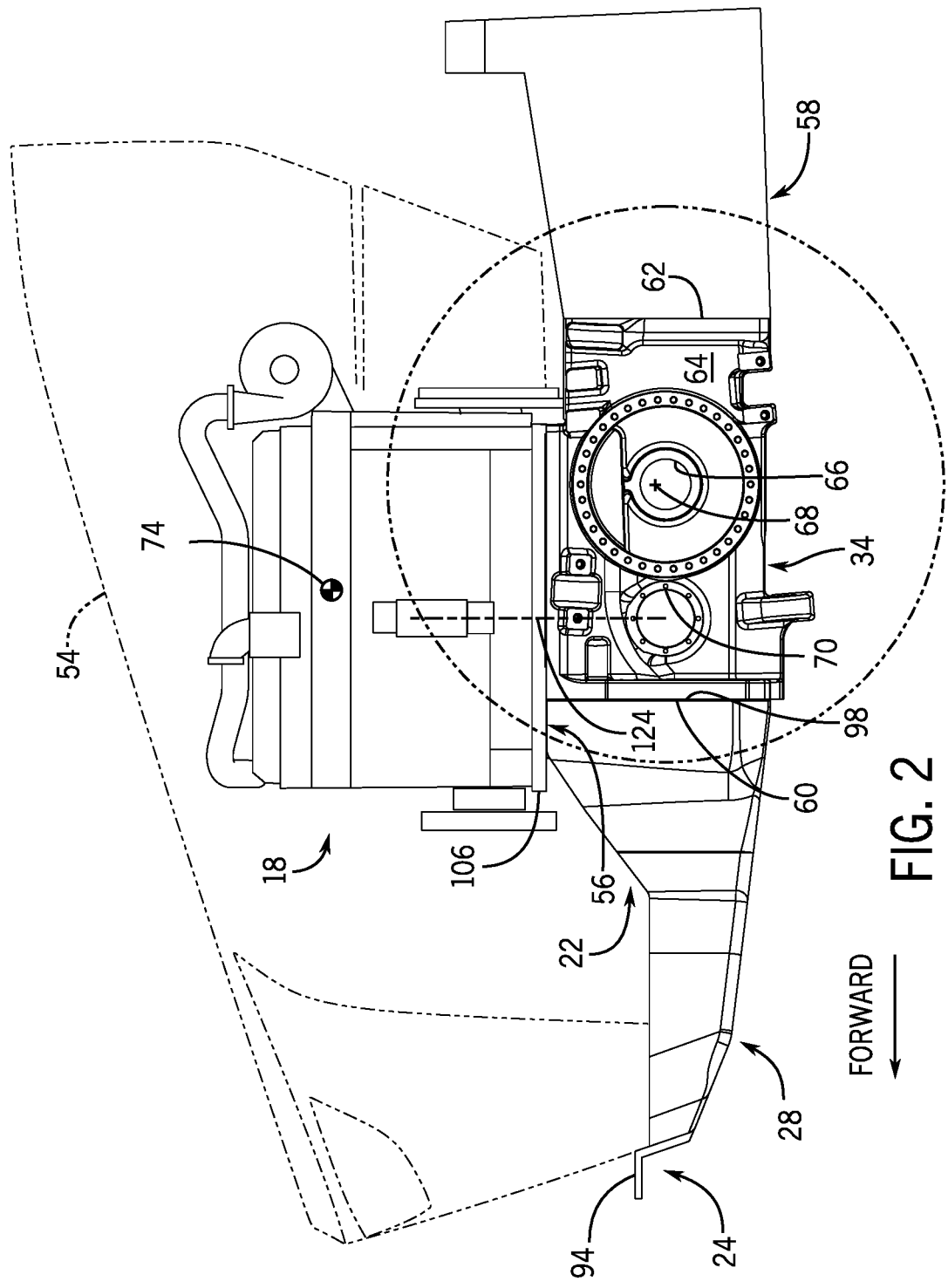
FIG. 2 is a side view of an engine and engine mounting assembly of the example work vehicle of FIG. 1.

Referring initially to FIG. 2, an example engine mounting assembly 20 may be considered to include the differential case 34 supporting the engine block 30, an oil pan 56 arranged in between the engine block 30 and the differential case 34, and the front frame element 28 that is mounted in a forward position on the differential case 34, as described in greater detail below. In one example, the differential case 34 is fixedly mounted to the chassis 12 of the work vehicle 10. In this example, the differential case 34 is mounted longitudinally between the front frame element 28 and a rear frame element 58 of the chassis 12. The differential case 34 may be of heavy-duty construction such as cast steel or iron to support the loads on the work vehicle 10. The differential case 34 is illustrated as an integrally formed part (e.g., formed of the same material at the same time by the same process), although it may be provided in any suitable configuration and number of parts.

As depicted in FIG. 2 and described in greater detail below, the differential case 34 may be generally rectangular or prism shaped with at least a partial front (or forward) end wall 60, a rear (or aft) end wall 62, and lateral side walls 64 (one of which is shown in FIG. 2) extending between the front and rear end walls 60, 62. Generally and as better shown in FIG. 3 described below, the front end wall 60 is generally U-shaped and mounts (e.g., via bolts) the front frame element 28 in a cantilevered fashion. The rear end wall 62 of the differential case 34 is mounted (e.g., bolted) to the rear frame element 58. The rear frame element 58 is mounted to additional components (not shown) of the work vehicle 10 and the chassis 12.

Each lateral side wall 64 of the differential case 34 includes an axle opening 66 for receiving a wheel axle 38a. The center of the axle opening 66 defines a centerline 68 extending laterally across the work vehicle 10. Each lateral side wall 64 of the differential case 34 further includes a suspension opening 70 for receiving a component of the suspension system 42 (e.g., suspension linkage 44, a control arm, etc., as depicted in FIG. 1). For example, the suspension linkage 44 may be mounted at one end in a ball-and-socket arrangement to the suspension opening 70 of the differential case 34 and mounted at an opposite end to the wheel axle 38a (FIG. 1).

Generally, the differential case 34 may be at a central *nexus* of the structural load bearing assembly 22 and also mounts various components related to the drivetrain 14, transmission 32, and wheel axles 38a, 38b (FIG. 1). Structurally, the differential case 34 is positioned between wheel axles 38a, 38b, below the engine 18, and directly behind the front frame element 28 for a front-mounted work implement.

In a general sense, the differential case 34 may be considered as a rigid housing for the oil pan 56 and various components (not shown) of the suspension system 42 and the differential. The differential case 34 may house all or some components of a differential (not shown) of the drivetrain, including u-joint(s), ring gear, pinion shaft(s), pinion gear(s), planet gear(s), side gears, clutch plates, bearings, and the like. Any type of differential may be mounted within the differential case 34, including an open differential, limited slip differential, or the like. As described below, the differential case 34 may provide mounting positions and/or support portions of a driveshaft, half shafts, and/or axle shafts, as well as components of the suspension system 42, including any support structures such as bearings (not shown, e.g., angled roller bearings) or joints (not shown, e.g., ball joints) for the wheel axles 38a, 38b and the suspension system 42. In sum, these components impart a number of structural loads on the differential case 34.

The engine mounting assembly 20 also includes the oil pan 56 mounted (e.g., bolted as discussed below) directly above the differential case 34 and mounted directly below the engine block 30. The oil pan 56 is arranged between the engine 18 and the differential case 34. The oil pan 56 may be formed of a cast metal or other heavy-duty construction to aid in sharing structural loads that are borne by the engine 18 and the differential case 34. As described in greater detail below, the oil pan 56 forms an oil sump 72 (FIG. 3) that functions to collect the motor oil that is used throughout the engine 18. The oil pan 56 is operatively connected to an oil filter (not shown) and an oil pump (not shown) for impelling pressurized oil throughout the engine 18. In this manner, the oil pan 56 is operatively configured to supply oil to the oil pump and oil filter in the engine 18 of the work vehicle 10.

The engine block 30 is positioned below the engine 18 and, along with the oil pan 56, is generally coextensive longitudinally (right-to-left as illustrated in FIG. 2) with the engine 18. The differential case 34 also extends longitudinally along, at least in part, the engine 18, particularly the engine block 30 that supports various components of the engine 18. The engine 18 defines a center of gravity 74 in the longitudinal direction of the work vehicle 10. In one aspect, the center of gravity 74 may be positioned longitudinally forward (i.e., in the forward travel direction of the work vehicle indicated in FIG. 2) of the centerline 68 of the axle opening 66 in the differential case 34. In other words, the center of gravity 74 may be positioned longitudinally forward of a rotational axis of the wheel axles 38a, 38b. At the same time, the center of gravity 74 may be positioned, at least in part, longitudinally behind the suspension opening 70 in the differential case. As illustrated, the oil pan 56 and the engine block 30 span longitudinally across the centerline 68. In particular, the oil pan 56 and the engine block 30 begin behind the centerline 68 of the axle opening 66 and terminate at a point forward of the centerline 68 that is beyond the front end wall 60 of the differential case 34. The oil pan 56 and engine block 30 thus hang partially over the front frame element 28. Various types and sizes (e.g., displacements) of engine may be used for the work vehicle 10, and the present disclosure contemplates various locations for the center of gravity 74 so long as the center of gravity is positioned relative to other components of the engine mounting assembly 20 in the manner discussed herein.

In one embodiment, the engine mounting assembly 20 and the engine 18 are configured for a compact fit within the work vehicle 10. As introduced above, the hood 54 of the work vehicle 10 operates to delimit the available vertical envelope for the engine 18 and various additional components (e.g., hydraulic components, electrical circuitry, sensors, etc.) mounted within the interior of the work vehicle 10. Likewise, and additionally referring to FIG. 1, the hood 54 delimits the sightlines across the exterior for the operator from the operator cabin 16, particularly through the windshield 52 and over the height and slope of the hood 54. To provide a lower overall height of the engine mounting assembly 20, the oil pan 56 is fit closely within the differential case 34. Moreover, to provide a desired volume of the oil sump 72 (FIG. 3) while limiting height, the oil pan 56 may extend forward beyond the differential case 34 to utilize available space above the front frame element 28. Each of these characteristics are discussed in greater detail below.

Collectively, the vehicle chassis 12 (including the front frame element 28 and rear frame element 58), differential case 34, oil pan 56, and engine block 30 constitute at least a portion of the structural load bearing assembly 22 of the work vehicle 10. As described above and additionally referring to FIG. 1, the work vehicle 10 may experience a variety of loads, particularly delivered via the wheels 40a, 40b and work implements mounted on the front or rear coupling areas 24, 26. The structural load bearing assembly 22 supports and distributes any static and dynamic loads on the work vehicle 10. With particular regard to the engine mounting assembly 20, the differential case 34 directly receives loads from a variety of sources. For example, the lateral side walls 64 of the differential case 34 are coupled to one of the wheel axles 38a, 38b and components of the suspension system 42, as well as power transmission, brake and housing components that facilitate mounting and rotation of the wheels 40a, 40b. Accordingly, the differential case 34 directly receives loads from the front frame element 28 and the wheel axles 38a, 38b. Because the oil pan 56 and the engine block 30 are rigidly fixed together along the longitudinal length of the differential case 34, these components also receive and transfer some or all of the loads imparted on the differential case 34, along with the weight load of the engine 18.

Figure 3:
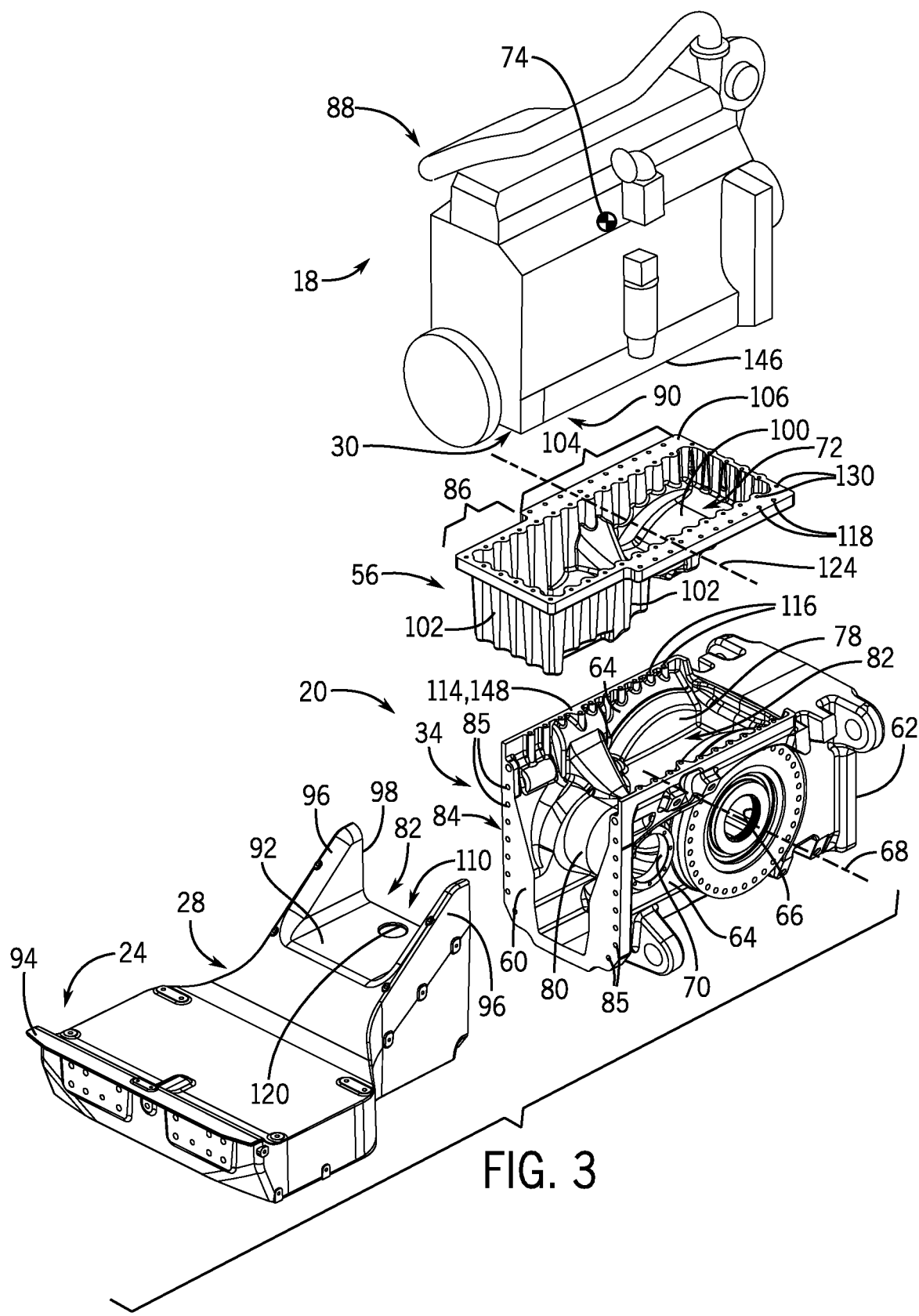
FIG. 3 is an exploded perspective view of the engine and engine mounting assembly of FIG. 2.
Figure 4:
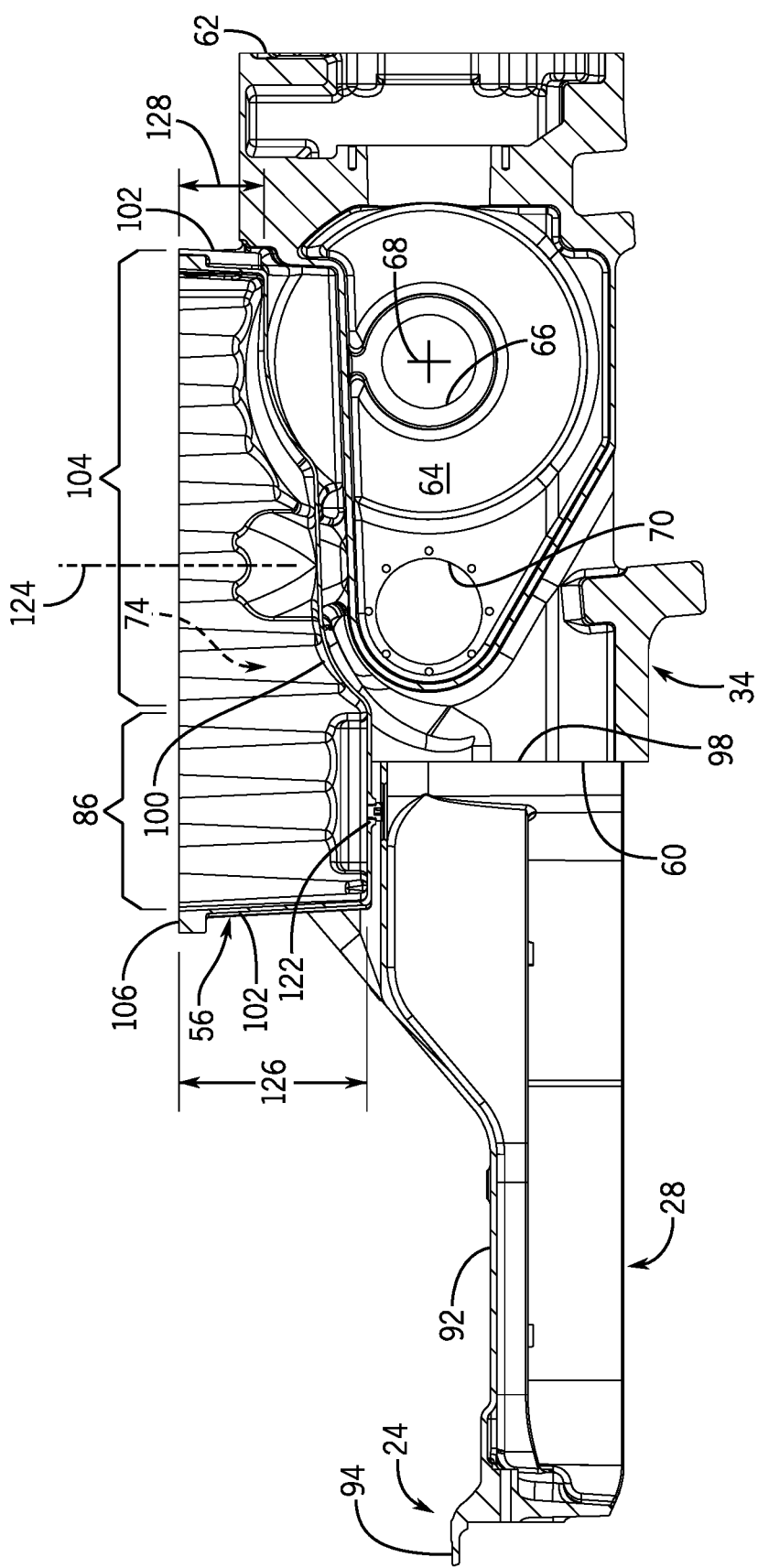
FIG. 4 is an enlarged cross-sectional view of the example engine mounting assembly of FIG. 2.

Reference is now also made to FIG. 3, which depicts the engine 18 and engine mounting assembly 20 in an exploded view to illustrate interconnections between the constituent parts. As noted above, the differential case 34 generally includes the front end wall 60, rear end wall 62, and lateral side walls 64. These walls 60, 62, 64 collectively form a differential case cavity 76. As shown, the differential case includes an axle support structure 78 that is generally tubular and extends through the cavity 76 between the axle openings 66. Similarly, a suspension support structure 80 that is generally tubular and extends through the cavity 76 between the suspension openings 70. Above the axle support structure 78 and the suspension support structure 80, the walls 60, 62, 64 of the differential case 34 define, at least in part, a pan-receiving recess 82.

The front end wall 60 of the differential case 34 defines a frame mounting area 84 that includes vertically-arranged mounting bores 85 for attaching the front frame element 28 via fasteners such as bolts (not shown). The front end wall 60 is generally U-shaped with an upwardly and forwardly open arrangement to accommodate the oil pan 56 (as described below). This U shape of the front end wall 60 contribute to the oil pan-receiving recess 82 and allows a front portion 86 of the oil pan 56 to extend forward beyond the differential case 34 along with a front portion 88 of the engine 18 and a front portion 90 of the engine block 30. Since the majority of the front end wall 60 is this open U shape, the differential case 34 may generally be considered to have an open front end wall 60 and three closed walls (lateral walls 64 and rear end wall 62).

The front frame element 28 has a bottom wall 92 that, when assembled, extends between the differential case 34 and the front coupling area 24. The front frame element 28 additionally has lateral walls 96 and a rear wall 98 for mounting to the differential case 34. The rear wall 98 is substantially open and U-shaped and may conform to the front end wall 60 of the differential case 34.

The front coupling area 24 includes a horizontal surface 94 that may be configured to support a work implement. The front coupling area 24 may include support structure (not shown, e.g., a three-point hitch) for holding a work implement. The horizontal surface 94 may be formed integrally with the front frame element 28 or may be coupled thereto. Likewise, the front coupling area 24 may be formed by various structures or assemblies. In some examples, the front coupling area 24 may be a portion of the front frame element 28, may be defined in part by the front frame element 28 (e.g., horizontal surface 94 of the front frame element 28 along with additional mounting structures not shown), or may be a separate structure mounted to the front frame element 28. In any arrangement, the front frame element 28 is configured to support loads from the front coupling area 24 and distribute these loads through the chassis 12 and the structural load bearing assembly 22.

The oil pan 56 generally includes a bottom wall 100 and upright walls 102 that together form the oil sump 72. In operation, the oil sump 72 contains and collects motor oil that is used throughout the engine 18. The oil pan 56 includes the front portion 86 extending beyond the front end wall 60 of the differential case 34 and a rear portion 104 positioned within the differential case 34. Additionally, the oil pan 56 has a mounting flange 106 extending from the upright walls 102. The mounting flange 106 provides for direct mounting of the oil pan 56 to both the engine block 30 and to the differential case 34 (e.g., via bolts as described below). It is to be understood that the oil pan 56 may include various ribs or trusses (some of which are shown) in the upright walls 102 or extending across the oil sump 72 to provide additional structural integrity.

The differential case 34 and the front frame element 28 are specifically configured (e.g., sized and shaped) to receive the oil pan 56 in a close fit. The walls 60, 62, 64 of the differential case 34 define, at least in part, a pan-receiving recess 82 above the axle support structure 78 and the suspension support structure 80. Similarly for the front frame element 28, the rear wall 98 is substantially open and U-shaped to define (along with the lateral side walls 64) a supplemental pan-receiving recess 110 for receiving a portion of the oil pan 56. The pan-receiving recess 82 is shaped to receive at least a portion of the oil pan 56 (e.g., receive a majority of the oil pan 56 in a lengthwise or longitudinal orientation as illustrated or alternatively only a rear portion 112 of the oil pan). The pan-receiving recess 82 may also be defined in part by the supplemental pan-receiving recess 110 of the front frame element 28.

For assembly, an upper surface 114 of the differential case extends along the collective perimeters of top surfaces of walls 60, 62, 64. Each lateral side of the upper surface 114 has a first plurality of bore holes 116 in a row located in or proximate to the upper surface 114. Correspondingly, each side of the mounting flange 106 of the oil pan 56 has a second plurality of bore holes 118 in a relatively outboard row for receiving fasteners such as bolts (not shown in FIG. 3).

When assembled as shown in FIG. 4, the oil pan 56 and the engine block 30 overlap the frame mounting area 84 at the front end wall 60 of the differential case 34 pan 56, fitting within the U-shape of the front end wall 60 and within the U-shape of the rear wall 98 of the front frame element 28. In this manner, the supplemental pan-receiving recess 110 of the front frame element 28 augments the pan-receiving recess 82 of the differential case 34 by receiving the front portion 86 of the oil pan 56. Accordingly, the volume of the oil pan 56 may be significantly greater than the volume of the pan-receiving recess 82 of the differential case 34 alone. The oil pan 56 is bolted to the differential case 34 but not the front frame element 28, and therefore the oil pan 56 and the engine 18 are cantilevered forward from the differential case 34. In particular, the front portion 86 of the oil pan 56 is cantilevered beyond the front end wall 60 of the differential case 34. The front frame element 28 also includes a bore 120 for allowing access and/or drainage for the oil pan 56, as discussed further below.

The oil pan 56 may include several features to improve the fit within the engine mounting assembly 20 and to provide the requisite structural strength. The bottom wall 100 and upright walls 102 of the oil pan 56 are sized and shaped to fit within the differential case 34, including various indents to accommodate the axle opening 66 and the suspension opening 70 along with surrounding structures for supporting the wheel axles 38a, 38b and components of the suspension system 42. As best shown in FIG. 3, the oil pan 56 spans across a lateral width of the differential case 34. This direct mounting may be provided with or without a gasket (not shown). In this manner the oil pan 56 is configured to conform, at least in part, to the pan-receiving recess 82 of the differential case 34. As best shown in FIG. 4, the bottom wall 100 of the oil pan 56 also includes a sump bore 122 configured for mounting an oil filter (not shown) and allowing draining. The sump bore 122 is in the front portion 86 of the oil pan 56 and therefore is positioned in front of the differential case 34 (and may also be positioned in front of the wheels 40a, 40b) for improved access via the bore 120 in the front frame element 28. The upright walls 102 are illustrated as substantially vertical, although in alternative examples one or more of the upright walls 102 may be angled or curved while still defining the oil sump 72. The oil pan 56 is illustrated as an integrally formed piece, for example a cast metal structure.

Referring generally to FIGS. 2-4, the oil pan 56 has a forward position relative to the differential case 34, the axle opening 66 for the wheel axle 38a, and relative to the wheel 40a. In particular, a longitudinal midpoint 124 of the oil pan 56 is positioned forward of the centerline 68 of the axle opening 66 in the differential case 34 for the wheel axles 38a, 38b. The longitudinal front portion 86 of the oil pan 56 has a front depth 126 that extends deeper (e.g., vertically in the perspective of FIG. 4) than a rear depth 128 of the rear portion 112 of the oil pan 56. The relatively forward position of the oil pan 56 also provides many benefits including increased size of the oil sump 72 and accessibility for maintenance/repair of the engine 18 and the oil pan 56 (e.g., changing the oil and filter without removing the wheels 40a, 40b or other components). Moreover, this forward position provides improved weight distribution across the structural load bearing assembly 22 of the work vehicle 10. For example, the work vehicle 10 may experience significant loads behind the front wheel axles 38a, 38b (e.g., via the operator cabin 16, rear-mounted or towed work implements, etc.). These loads are balanced out by the center of gravity 74 of the engine 18 being positioned forward of the front wheel axles 38a, 38b, which improves load distribution throughout the structural load bearing assembly 22 and reduces torsional forces on the differential case 34 and/or the wheel axles 38a, 38b.

Figure 5A:
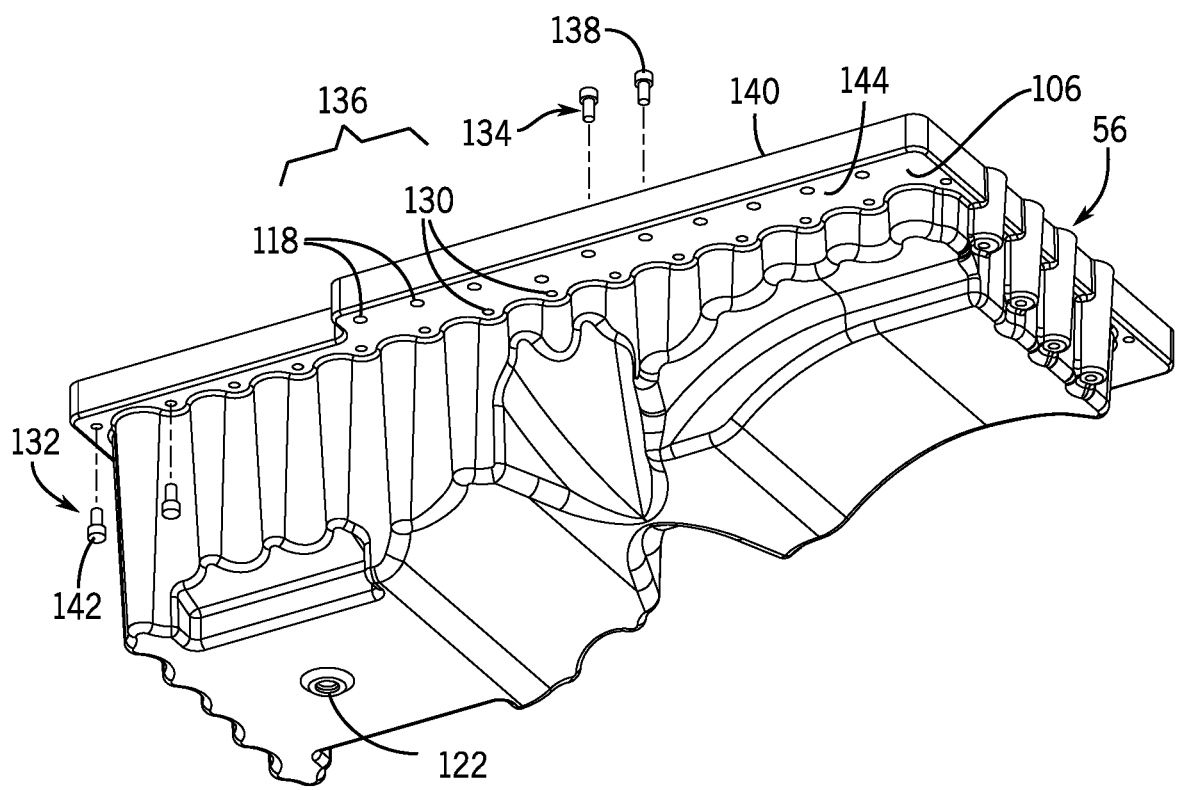
FIG. 5A is a bottom perspective view of an example oil pan of the engine mounting assembly of FIG. 2.

The view of FIG. 5A depicts an example oil pan 56 removed from the engine mounting assembly 20 in which the oil pan 56 is a coupling element between the engine 18 and the differential case 34. In particular, and referencing FIGS. 2-4 in addition to FIG. 5A, the mounting flange 106 of the oil pan 56 and has a first plurality of bore holes 130 for fixing the engine 18 to the oil pan 56 (e.g., via a first plurality of mounting bolts 132) and the second plurality of bore holes 118 for fixing the oil pan 56 to the differential case 34 (e.g., via a second plurality of bolts 134). Collectively, the first plurality of bore holes 130 and second plurality of bore holes 118 constitute a plurality of mounting bores 136 that receives a plurality of mounting bolts 132, 134 for coupling the oil pan 56 to the engine 18 (via the engine block 30) and coupling the oil pan 56 to the differential case 34. The first plurality of bore holes 130 are illustrated in a longitudinal row that is laterally inboard of the second plurality of bore holes 118 that are also in a longitudinal row, although these relative inboard/outboard positions may be switched. Likewise, one or both of the first and second plurality of bore holes 130, 118 may have other arrangements that are not aligned in rows.

The plurality of mounting bolts 134 for the second plurality of bore holes 118 may be installed top-down, such that respective bolt heads 138 rest against a top side 140 of the mounting flange 106. This arrangement allows for easy access to assemble the oil pan 56 onto the differential case 34. By contrast, the plurality of mounting bolts 132 for the first plurality of bore holes 130 may be installed bottom-up, such that respective bolt heads 142 rest against a bottom side 144 of the mounting flange 106. In alternative examples not illustrated, one or both of the plurality of mounting bolts 132, 134 may be mounted in a reverse fashion (top-down or bottom-up) from the illustrated example.

Moreover, the mounting flange 106 may be shaped and configured to closely fit with corresponding surfaces of the engine block 30 and the differential case 34. As illustrated in FIGS. 2-5A, the mounting flange 106 may be substantially planar with the plurality of mounting bores 136 positioned in its plane. The planar shape of the mounting flange 106 may face and engage a corresponding planar face 146 of the engine block 30 and a planar face 148 of the differential case 34. The mounting flange 106 is illustrated as being integrally formed with the oil pan 56, although it may be a separate component affixed to the upright walls 102 of the oil pan 56.

Figure 5B:
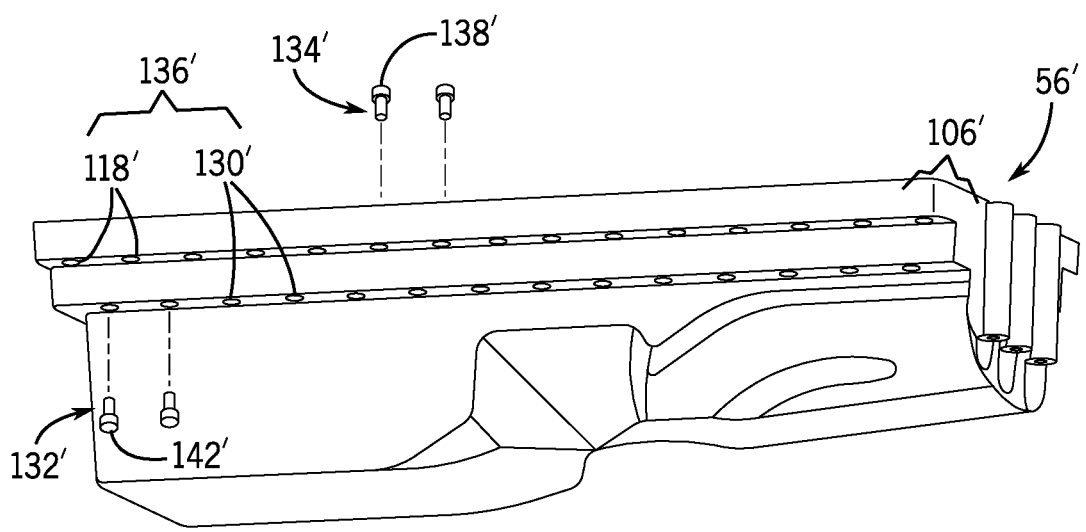
FIG. 5B is a bottom perspective view of another example oil pan that may be incorporated into the engine mounting assembly of FIG. 2.

In some embodiments, engine mounting assembly 20 described above may be implemented with an oil pan having an alternative mounting configuration, such as an oil pan 56' depicted in the example of FIG. 5B. Unless otherwise noted, the oil pan 56' of FIG. 5B is similar to the oil pan 56 described above with reference to FIGS. 2-5A. As shown in FIG. 5B, the oil pan 56' includes a mounting flange 106' that is stepped with the plurality of mounting bores 136' at two different heights. For example, the mounting flange 106' defines the second plurality of bore holes 118' at a relatively higher step than the first plurality of bore holes 130', although these relative positions may be reversed. As in the oil pan 56 depicted in FIG. 5A, the mounting flange 106' and overall arrangement of the oil pan 56' of FIG. 5B provides a structure that may be rigidly affixed to both an engine block (e.g., engine block 30 of FIGS. 2 and 3) and a differential case (e.g., differential case 34 of FIGS. 2-4) such that all three components receive and distribute substantially similar structural loads as constituent parts of the structural load bearing assembly of the work vehicle described herein.

The foregoing describes one or more example engine mounting assemblies in detail. Various other configurations are possible within the scope of this disclosure. Aspects of the disclosed examples provide for a robust structural load bearing assembly of the work vehicle. The differential case performs a variety of functions and supports a variety of structures that may transfer significant loads to the structural load bearing assembly. The oil pan and engine block are mounted to be part of the structural load bearing assembly and thus contribute to the structural load path and also are positioned to accommodate repair/maintenance access, balance loads upon the differential case and wheel axles, and improve operator sightlines.

ENUMERATED EXAMPLES

Also, the following examples are provided, which are numbered for easier reference.

1. An engine mounting assembly for supporting an engine in a work vehicle is provided. In various embodiments, the engine mounting assembly comprises a front frame element defining, at least in part, a structural load bearing assembly of the work vehicle, a differential case mounted to the front frame element at a frame mounting area, the differential case having an opening configured to receive an axle assembly of the work vehicle and having walls defining, at least in part, a pan-receiving recess, and an oil pan having upright and bottom walls defining an oil sump, the oil pan configured, at least in part, to conform to the pan-receiving recess of the differential case to be supported by the differential case and overlap the frame mounting area, the oil pan having a mounting flange extending from the upright walls with a plurality of mounting bores that receives a plurality of mounting bolts for coupling the oil pan to the engine and the oil pan to the differential case, wherein the differential case and the oil pan form part of the structural load bearing assembly of the work vehicle to transfer structural loads to and from the front frame element.

2. The engine mounting assembly of example 1, wherein the oil pan has a longitudinal front portion extending cantilevered beyond the differential case.

3. The engine mounting assembly of example 1, wherein a longitudinal midpoint of the oil pan is positioned forward of a centerline of the opening.

4. The engine mounting assembly of example 1, wherein the oil pan spans across a lateral width of the differential case.

5. The engine mounting assembly of example 1, wherein the front frame element has walls defining, at least in part, a supplemental pan-receiving recess.

6. In further embodiments, a work vehicle is provided. The work vehicle includes an engine including an engine block, the engine defining an engine center of gravity in a longitudinal travel direction of the work vehicle, an engine mounting assembly including: a differential case mounted to the frame at a frame mounting area, the differential case having a first opening configured to receive an axle assembly of the work vehicle and having walls defining, at least in part, a pan-receiving recess, and an oil pan having upright and bottom walls defining an oil sump, the oil pan configured, at least in part, to conform to the pan-receiving recess of the differential case to be supported by the differential case and overlap the frame mounting area, the oil pan having a mounting flange extending from the upright walls with a plurality of mounting bores that receives a plurality of mounting bolts for coupling the oil pan to the engine and the oil pan to the differential case; a front frame element connected to the frame mounting area of the differential case; and a rear frame element connected to a rear end of the differential case, wherein at least the engine block, the engine mounting assembly, the front frame element, and the rear frame element form a structural load bearing assembly of the work vehicle that is configured to transfer structural loads between the engine block, the engine mounting assembly, the front frame element, and the rear frame element.

7. The work vehicle of example 6, wherein the oil pan is cantilevered from the differential case.

8. The work vehicle of example 6, wherein the oil pan and the engine block each have a longitudinal front portion extending beyond the differential case in cantilevered fashion.

9. The work vehicle of example 6, wherein the engine center of gravity is positioned longitudinally forward of a centerline of the first opening.

10. The work vehicle of example 9, wherein the engine block is bolted directly to the mounting flange of the oil pan, and the differential case is bolted directly to the mounting flange of the oil pan.

11. The work vehicle of example 10, wherein the engine block is bolted with a first plurality of bolts having heads against an underside of the mounting flange, and the differential case is bolted with a second plurality of bolts having heads against a top side of the mounting flange.

12. The work vehicle of example 6, wherein the mounting flange includes a first plurality of bore holes for attaching the oil pan to the engine block and a second plurality of bore holes for attaching the oil pan to the differential case.

13. The work vehicle of example 6, further comprising a rear frame element incorporated into the structural load bearing assembly of the work vehicle.

14. The work vehicle of example 6, further comprising wheel axle mounted to the first opening of the differential case.

15. The work vehicle of example 14, the wheel axle including a suspension linkage mounted to the differential case, the suspension linkage connected to the wheel axle and configured to allow pivoting of the wheel axle.

CONCLUSION

The examples discussed above result in a variety of benefits of the disclosed engine mounting assembly. For example, the forward position of the engine and oil pan allow for easy access for repair and maintenance by avoiding the front wheels. This forward position also improves load distribution along a structural load path of the work vehicle, particularly the load distribution relative to the front axle assembly, which reduces torsion loads and mitigates potential issues in the structural load bearing assembly. Further, the mounting flange of the oil pan allows for top-down bolting of the engine block to the oil pan, providing a simplified assembly method. Moreover, the engine mounting assembly is vertically compact, allowing a low hood height and improved sightlines for an operator in the cabin of the work vehicle. The oil pan arrangement (e.g., being a separate part extending forward of the differential case) provides both a large oil sump volume and a maximized casting size of the differential case while the differential case still can support a variety of mechanical components (e.g., components of the suspension system and/or components of a MWFD). The mechanical components supported by the differential case improve the work vehicle's driving traction and user comfort, resulting in improved performance of agricultural tasks in the field and on-road driving. The structural load bearing assembly of the work vehicle is suitably robust and strong to support and distribute significant static and dynamic loads.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An engine mounting assembly for supporting an engine in a work vehicle, comprising:
    a front frame element defining, at least in part, a structural load bearing assembly of the work vehicle;
    a differential case mounted to the front frame element at a frame mounting area, the differential case having an opening configured to receive an axle assembly of the work vehicle and having walls defining, at least in part, a pan-receiving recess; and
    an oil pan having upright and bottom walls defining an oil sump, the oil pan configured, at least in part, to conform to the pan-receiving recess of the differential case to be supported by the differential case and overlap the frame mounting area, the oil pan having a mounting flange extending from the upright walls with a plurality of mounting bores that receives a plurality of mounting bolts for coupling the oil pan to the engine and the oil pan to the differential case;
    wherein the differential case and the oil pan form part of the structural load bearing assembly of the work vehicle to transfer structural loads to and from the front frame element.

2. The engine mounting assembly of claim 1, wherein the oil pan has a longitudinal front portion extending cantilevered beyond the differential case.

3. The engine mounting assembly of claim 2, wherein the front portion of the oil pan extends further below the mounting flange than a rear portion of the oil pan.

4. The engine mounting assembly of claim 1, wherein a longitudinal midpoint of the oil pan is positioned forward of a centerline of the opening.

5. The engine mounting assembly of claim 1, wherein the oil pan spans across a lateral width of the differential case.

6. The engine mounting assembly of claim 1, wherein the front frame element has walls defining, at least in part, a supplemental pan-receiving recess.

7. The engine mounting assembly of claim 1, wherein the mounting flange is planar.

8. The engine mounting assembly of claim 1, the oil pan operatively configured to supply oil to an oil pump and an oil filter in an engine of the work vehicle.

9. A work vehicle, comprising:
    an engine including an engine block, the engine defining an engine center of gravity in a longitudinal travel direction of the work vehicle;
    an engine mounting assembly, including:
        a differential case having a frame mounting area, the differential case having a first opening configured to receive an axle assembly of the work vehicle and having walls defining, at least in part, a pan-receiving recess, and
        an oil pan having upright and bottom walls defining an oil sump, the oil pan configured, at least in part, to conform to the pan-receiving recess of the differential case to be supported by the differential case and overlap the frame mounting area, the oil pan having a mounting flange extending from the upright walls with a plurality of mounting bores that receives a plurality of mounting bolts for coupling the oil pan to the engine and the oil pan to the differential case;
    a front frame element connected to the frame mounting area of the differential case; and
    a rear frame element connected to a rear end of the differential case, wherein at least the engine block, the engine mounting assembly, the front frame element, and the rear frame element form a structural load bearing assembly of the work vehicle that is configured to transfer structural loads between the engine block, the engine mounting assembly, the front frame element, and the rear frame element.

10. The work vehicle of claim 9, wherein the oil pan is cantilevered from the differential case.

11. The work vehicle of claim 9, wherein the oil pan and the engine block each have a longitudinal front portion extending beyond the differential case in cantilevered fashion.

12. The work vehicle of claim 11, wherein the longitudinal front portion of the oil pan extends further below the mounting flange than a rear portion of the oil pan.

13. The work vehicle of claim 9, wherein the engine center of gravity is positioned longitudinally forward of a centerline of the first opening.

14. The work vehicle of claim 9, wherein the engine block is bolted directly to the mounting flange of the oil pan, and the differential case is bolted directly to the mounting flange of the oil pan.

15. The work vehicle of claim 14, wherein the engine block is bolted with a first plurality of bolts having heads against an underside of the mounting flange, and the differential case is bolted with a second plurality of bolts having heads against a top side of the mounting flange.

16. The work vehicle of claim 9, wherein the mounting flange includes a first plurality of bore holes for attaching the oil pan to the engine block and a second plurality of bore holes for attaching the oil pan to the differential case.

17. The work vehicle of claim 16, wherein the first plurality of bore holes is located laterally inboard the second plurality of bore holes.

18. The work vehicle of claim 9, further comprising a rear frame forms part of the structural load bearing assembly of the work vehicle.

19. The work vehicle of claim 9, further comprising a wheel axle mounted to the first opening of the differential case.

20. The work vehicle of claim 19, the axle assembly including a suspension linkage mounted to the differential case, the suspension linkage mounted at an opposite end to the wheel axle and configured to allow pivoting of the wheel axle.

* * * * *